Figure 1:
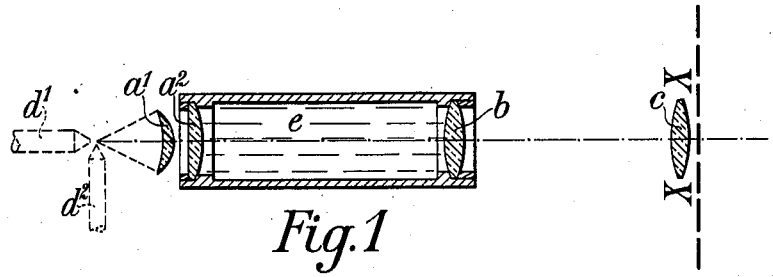

UNITED STATES PATENT OFFICE.

RUDOLF STRAUBEL, OF JENA, GERMANY, ASSIGNOR TO THE FIRM OF CARL ZEISS, OF JENA, GERMANY.

LIGHTING SYSTEM FOR CINEMATOGRAPHS.

1,143,663.    Specification of Letters Patent.    Patented June 22, 1915.

Application filed May 22, 1914. Serial No. 840,361.

*To all whom it may concern:*

Be it known that I, RUDOLF STRAUBEL, a citizen of the German Empire, residing at Jena, Germany, have invented a new and useful Lighting System for Cinematographs, of which the following is a specification.

The invention forms a development of those lighting systems for cinematographs, in which a condenser system serves the purpose of forming an image of a source of light approximately at the locus of a collective lens, while the said collective lens serves for forming an image of the exit pupil of the condenser system in the plane of the film, and in which an auxiliary condenser system lying near the film plane serves for forming an image of the said image of the source of light in the entrance pupil of a projection system. When one or more cooling chambers are introduced into such a system, with the usual construction of cooling chamber the number of reflecting surfaces in the system is added to and the loss of light thereby increased. According to the invention this increase in the number of reflecting surfaces may be restricted or entirely avoided, by letting at least two of the water-bounded chamber-surfaces belong to the lenses forming the lighting system. Such an arrangement results in different constructional forms according to the number and disposition of the cooling chambers in the lighting system. In the simplest case a cooling chamber will be given such dimensions as to fill the space between two lenses of the lighting system and to be thus bounded on both sides by lenses. The cooling chamber may be further enlarged and be composed of two chambers, each of which may be bounded either on both sides by a lens or only on one side by a lens and on the other by a plane (or an arched) plate. In each of the three cases, that are possible with such an arrangement, one lens of the lighting system comes to lie within the entire cooling chamber.

In the annexed drawing four constructional examples of the invention are shown, each by a longitudinal section. In each case the same lighting system is taken as a basis, $a^1$, $a^2$ being a two-part condenser system, $b$ a collective lens and $c$ an auxiliary condenser lens. The collective lens $b$ is located approximately at the locus of the image of a source of light, which is indicated by the two carbons $d^1$ and $d^2$ of an electric arc lamp, while the auxiliary condenser lens $c$ is disposed in the neighborhood of the image-plane X X of a projection system not shown in the drawing.

Figure 2:
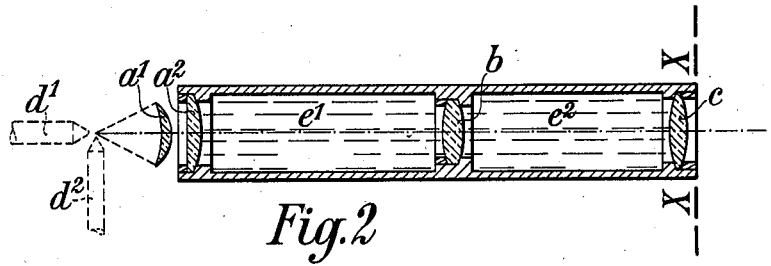
Figure 3:
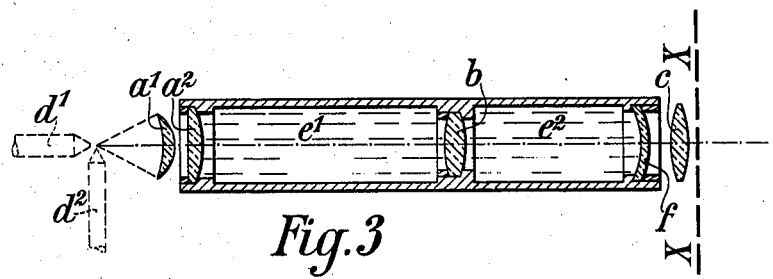
Figure 4:
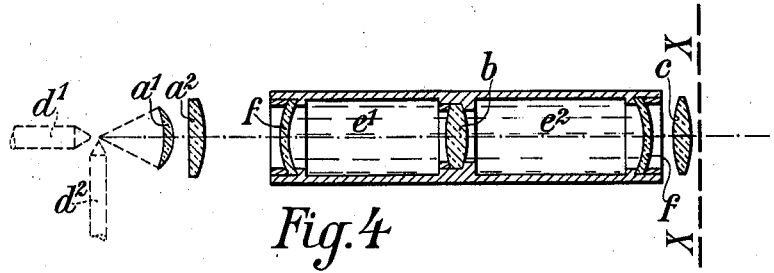

The first example (Figure 1) shows a case, in which a cooling chamber $e$ is closed at both sides by lenses, namely by the condenser lens $a^2$ and the collective lens $b$. In the second example (Fig. 2) two cooling chambers $e^1$ and $e^2$ corresponding to Fig. 1 are united, so that the collective lens $b$ comes to lie within the entire cooling chamber. Fig. 3 shows the combination of a cooling chamber $e^1$, which corresponds to Fig. 1, with a cooling chamber $e^2$, which is bounded on one side by the collective lens $b$ and on the other side by an arched plate $f$; the collective lens $b$ again lies within the entire cooling chamber. Fig. 4 shows the combination of two cooling chambers $e^1$ and $e^2$, each of which is bounded on one of its sides by the collective lens $b$ and on the other side by an arched plate $f$; the collective lens $b$ again lies within the entire cooling chamber.

I claim:

In a lighting system for cinematographs, comprising a source of light, a collective lens, a condenser system adapted to form an image of the said source of light approximately at the locus of the said collective lens, an auxiliary condenser system positioned on the opposite side of the said collective lens to the said condenser system, the said collective lens being adapted to form an image of the exit pupil of the said condenser system in the neighborhood of the said auxiliary condenser system, and at least one cooling chamber fitted between the two condenser systems, at least two of the water-bounded chamber-surfaces being surfaces of lenses of the lighting system.

RUDOLF STRAUBEL.

Witnesses:
  PAUL KRÜGER,
  FRITZ SANDER.